F. C. STUCKEL.
HOUSEHOLD UTENSIL.
APPLICATION FILED OCT. 25, 1911.
1,202,120.
Patented Oct. 24, 1916.
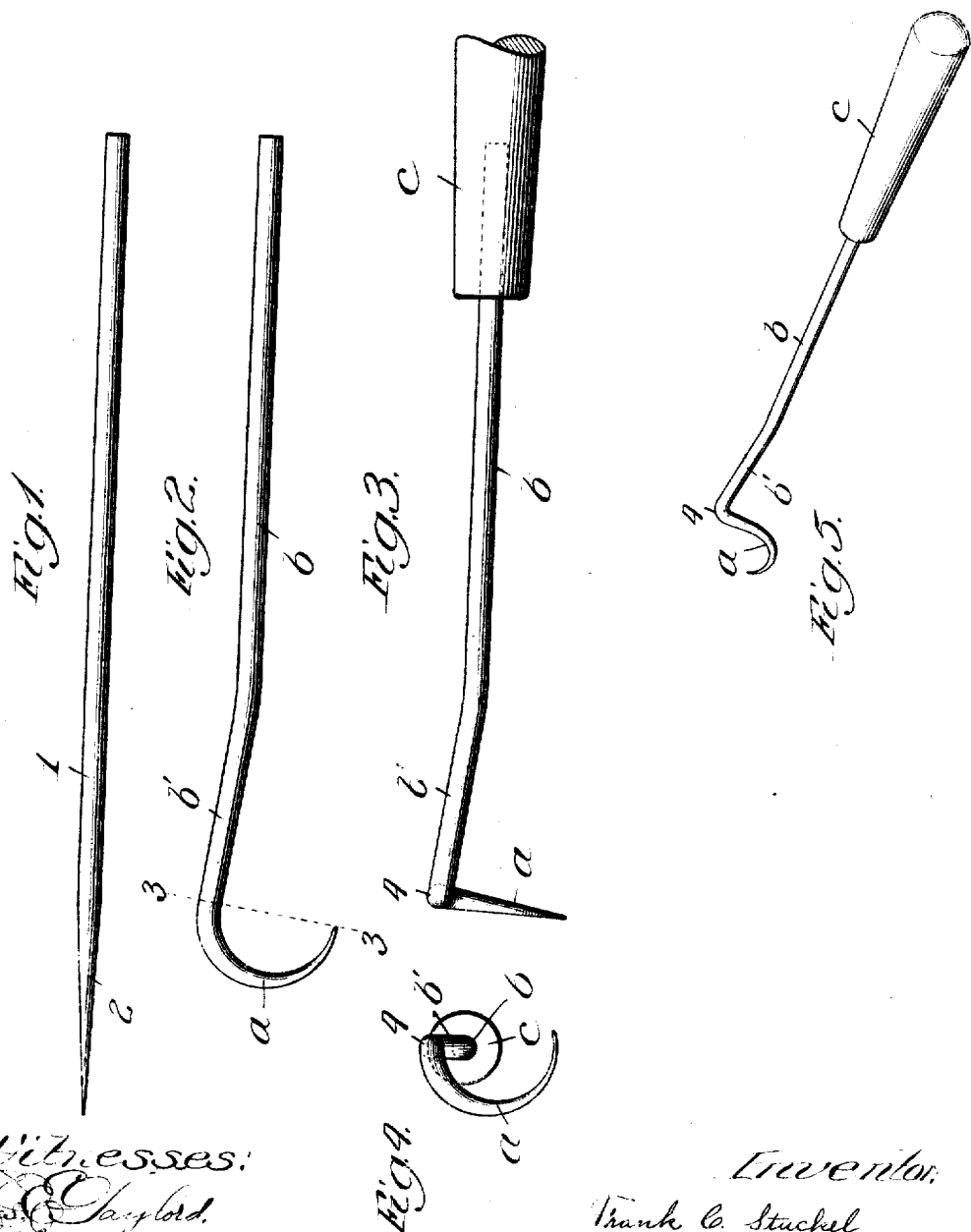

UNITED STATES PATENT OFFICE.

FRANK C. STUCKEL, OF RACINE, WISCONSIN, ASSIGNOR TO UNIVERSAL FASTENING CO., OF RACINE, WISCONSIN.

HOUSEHOLD UTENSIL.

1,202,120.      Specification of Letters Patent.      Patented Oct. 24, 1916.

Application filed October 25, 1911. Serial No. 656,615.

*To all whom it may concern:*

Be it known that I, FRANK C. STUCKEL, a citizen of the United States, and a resident of Racine, county of Racine, and State of Wisconsin, have invented certain new and useful Improvements in Household Utensils, of which the following is a full, clear, and exact description.

The invention relates to household utensils and seeks to provide an improved hook which can be conveniently used as a substitute for a fork in withdrawing articles of food from bottles, pans, kettles and the like.

The invention consists in the features of construction hereinafter set forth, illustrated in the accompanying drawings and more particularly pointed out in the appended claims.

Figures 1 and 2 illustrate the improved utensil in successive steps of its manufacture. Fig. 3 is an elevation of the improved device. Fig. 4 is an end view thereof and Fig. 5 is a perspective view thereof.

The improved utensil comprises a shank which terminates in a pointed semi-circular or curved hook arranged in a plane transverse to the axis of the shank. The shank and terminal hook are preferably formed of a round steel rod 1, the outer end portion of which forms the hook and is first pointed or sharpened, as indicated at 2 in Fig. 1. At the next operation the sharpened portion 2 is bent to form a curved semi-circular hook $a$, the remainder of the rod forming the shank $b$ of the hook. At this stage of the manufacture the hook $a$ is arranged in the same plane as the shank $b$. Preferably, also, the outer portion $b'$ of the shank $b$ is inclined or offset, as indicated in Fig. 2. The portion $b'$ inclines away from the axis of the main body of the shank $b$ in one direction, while the hook $a$ extends in the opposite direction across the axis of the shank. At the next operation, the hook $a$ is bent laterally along the line 3—3 of Fig. 2, so that the hook lies in a plane transverse to the axis of the shank $b$ and preferably in a plane substantially at right angles to the inclined shank portion $b'$. The utensil is completed by inserting the shank in one end of a suitable handle $c$, preferably formed of wood.

The utensil is found extremely handy and useful in lifting articles of food vertically from pots or pans. When the utensil is held in the hand it may be readily twisted or rotated about the axis of the shank $b$ and handle $c$ and the sharpened hook is thereby engaged with an article of food. The latter can then be lifted in vertical direction and will not slip off the hook $a$, because of the arrangement of the latter in a plane transverse to the axis of its shank.

The improved utensil may be made in different sizes for different purposes. One of small size, that is to say, one in which the distance from the bend 4 of the hook to the point thereof is about a half an inch, can be advantageously employed for withdrawing olives, pickles or the like from bottles. A somewhat larger size measuring, for example, about an inch from the bend 4 of the hook to its point, can be used about a cooking stove for handling articles of food cooked in pots, kettles or the like and the hook can also be used to advantage in handling hot cooking vessels and in moving the covers therefrom. It should be noted that, preferably, the hook $a$ is curved in righthand direction so that it can be readily and conveniently manipulated.

It is obvious that the improved device may be varied in size and changes made in the details set forth without departure from the essentials of the invention as defined in the claims.

I claim as my invention:—

1. A household utensil, comprising a single shank substantially straight throughout the greater portion of its length and having its outer portion offset in one direction from the axis of the shank and terminating in a single, semi-circular, gradually tapered hook extending in the opposite direction across the axis of the shank and arranged entirely in a single plane transverse to the axis of the shank and at an angle thereto slightly greater than a right angle, substantially as described.

2. A household utensil comprising a single, substantially straight metallic shank having its outer portion slightly inclined in one direction to the axis of the shank and terminating in a single, semi-circular, gradually tapered hook extending in the opposite direction across the axis of the shank and arranged in a single plane substantially at right angles to the inclined portion of said shank, substantially as described.

FRANK C. STUCKEL.

Witnesses:
 E. M. JOHNSON,
 WM. F. SAWYER.